(12) United States Patent
Heo

(10) Patent No.: US 7,963,607 B2
(45) Date of Patent: Jun. 21, 2011

(54) RECLINING DEVICE FOR SEATS IN VEHICLES

(75) Inventor: Kyoung Heo, Ulsan (KR)

(73) Assignee: DAS Corporation, Gyeongsangbuk-do (KR)

( * ) Notice: Subject to any disclaimer, the term of this patent is extended or adjusted under 35 U.S.C. 154(b) by 271 days.

(21) Appl. No.: 12/304,650

(22) PCT Filed: Mar. 12, 2007

(86) PCT No.: PCT/KR2007/001193
§ 371 (c)(1),
(2), (4) Date: Dec. 12, 2008

(87) PCT Pub. No.: WO2007/145418
PCT Pub. Date: Dec. 21, 2007

(65) Prior Publication Data
US 2009/0200850 A1     Aug. 13, 2009

(30) Foreign Application Priority Data

Jun. 15, 2006 (KR) ......................... 10-2006-0053831

(51) Int. Cl.
*B60N 2/235* (2006.01)
(52) U.S. Cl. ................................. 297/367 P; 297/367 R
(58) Field of Classification Search ............. 297/367 R, 297/367 P, 367 L
See application file for complete search history.

(56) References Cited

U.S. PATENT DOCUMENTS

| 4,143,905 | A | * | 3/1979 | Hensel et al. | 296/65.17 |
| 5,590,931 | A | * | 1/1997 | Fourrey et al. | 297/366 |
| 5,857,746 | A | * | 1/1999 | Barrere et al. | 297/367 R |
| 6,312,053 | B1 | | 11/2001 | Magyar | |
| 6,676,217 | B2 | * | 1/2004 | Lange | 297/367 R |
| 6,908,156 | B1 | * | 6/2005 | Park et al. | 297/366 |
| 7,165,813 | B2 | * | 1/2007 | Tame | 297/367 R |
| 7,341,311 | B2 | * | 3/2008 | Ohba | 297/367 R |
| 7,354,109 | B2 | * | 4/2008 | Oki | 297/367 R |
| 7,578,557 | B2 | * | 8/2009 | Becker et al. | 297/367 R |
| 2002/0175548 | A1 | * | 11/2002 | Asano et al. | 297/367 |
| 2006/0055222 | A1 | * | 3/2006 | Bonk et al. | 297/367 |

FOREIGN PATENT DOCUMENTS

| JP | 2004-105637 | 4/2004 |
| KR | 10-2003-0092870 | 12/2003 |

* cited by examiner

*Primary Examiner* — Peter R. Brown
(74) *Attorney, Agent, or Firm* — Dickstein Shapiro LLP

(57) ABSTRACT

The present invention relates to a reclining device for seats in vehicles, which has improved engagement force between an upper tooth bracket and an operating part, improved overall strength and durability, and improved quality due to the improvement in the connection structure of pole gears and rear guide protrusions. Further, the reclining device provides improved ride comfort for the driver and passengers and prevents operational noise.

3 Claims, 6 Drawing Sheets

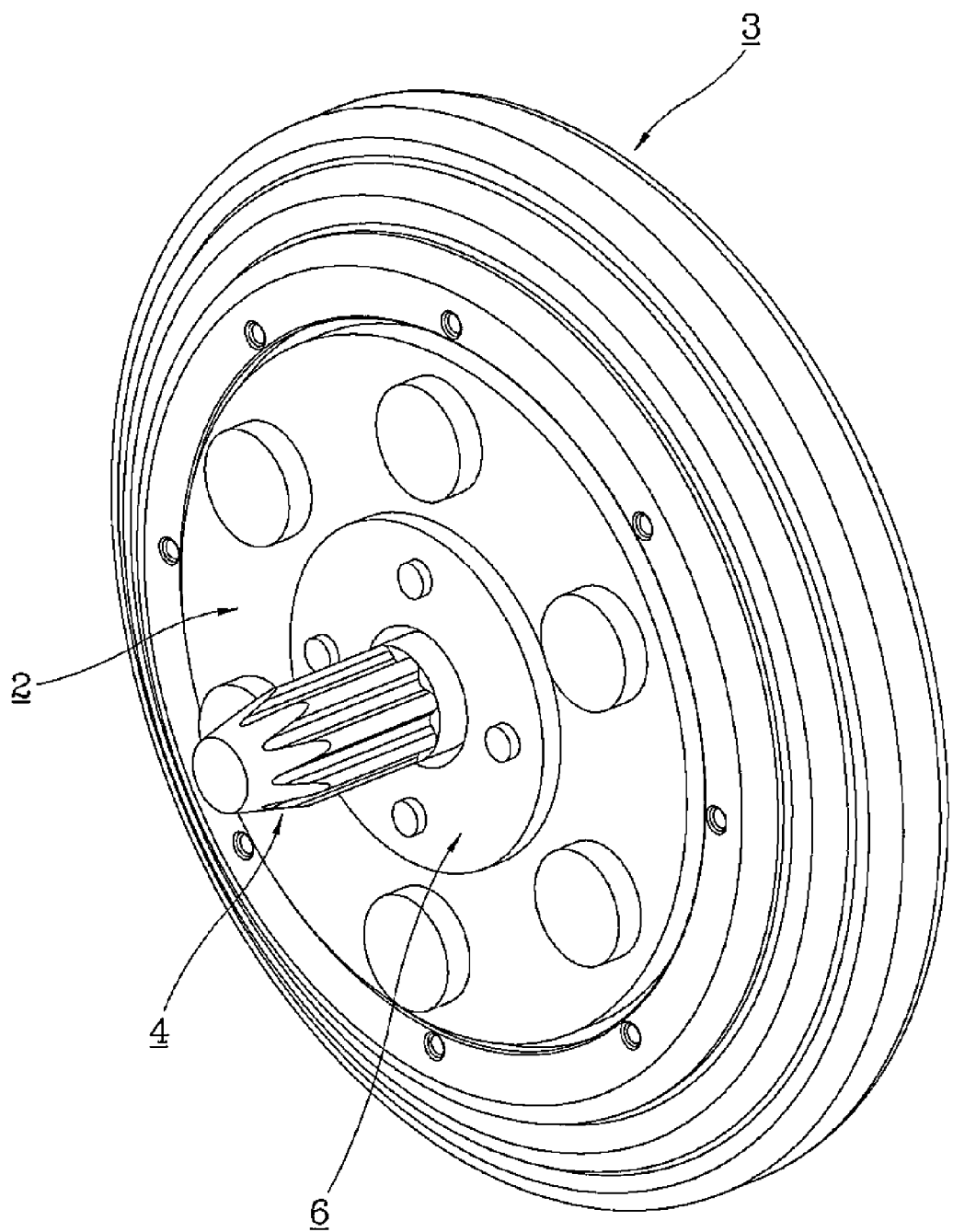
[Fig. 1]

[Fig. 2]
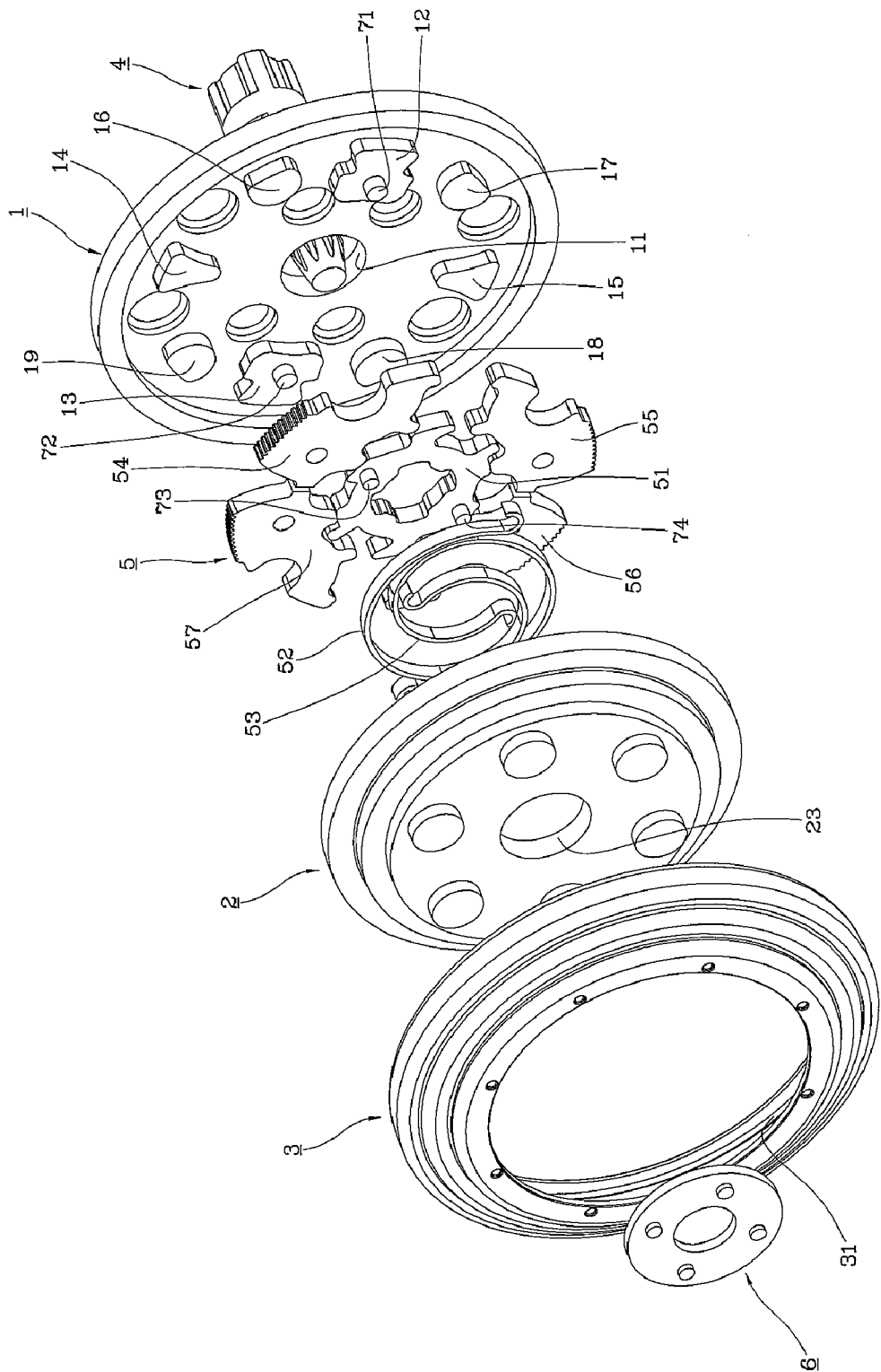

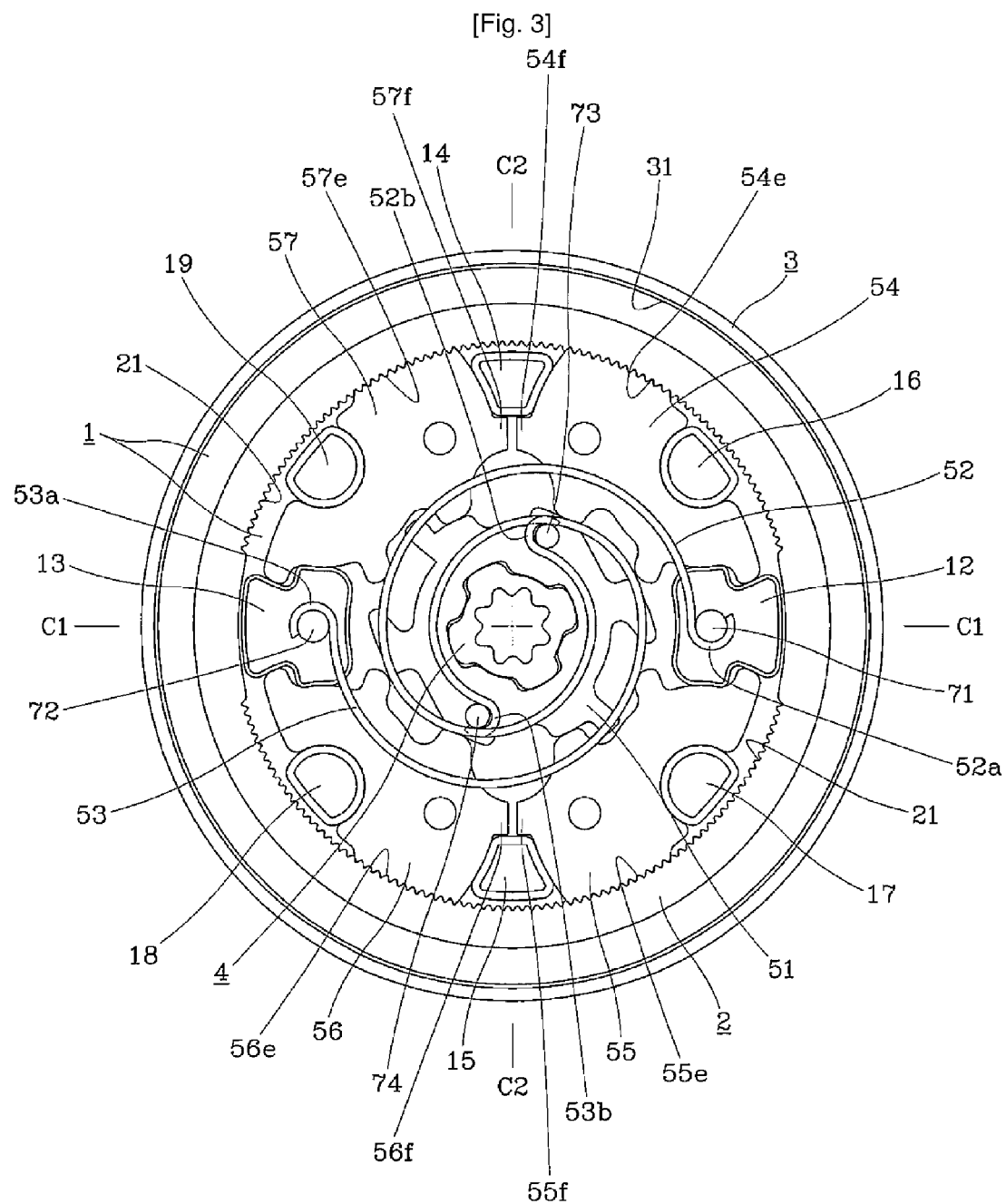
[Fig. 3]

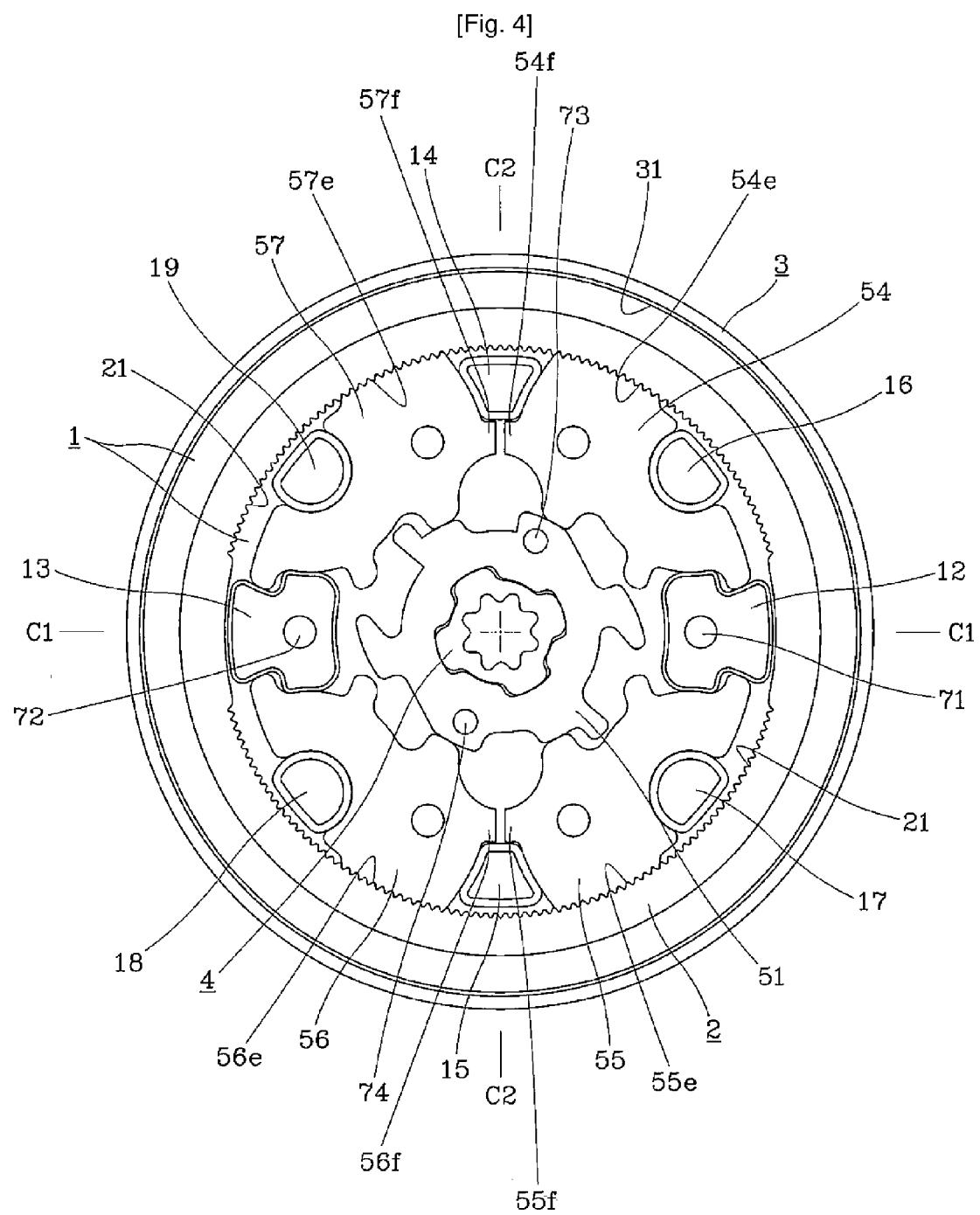

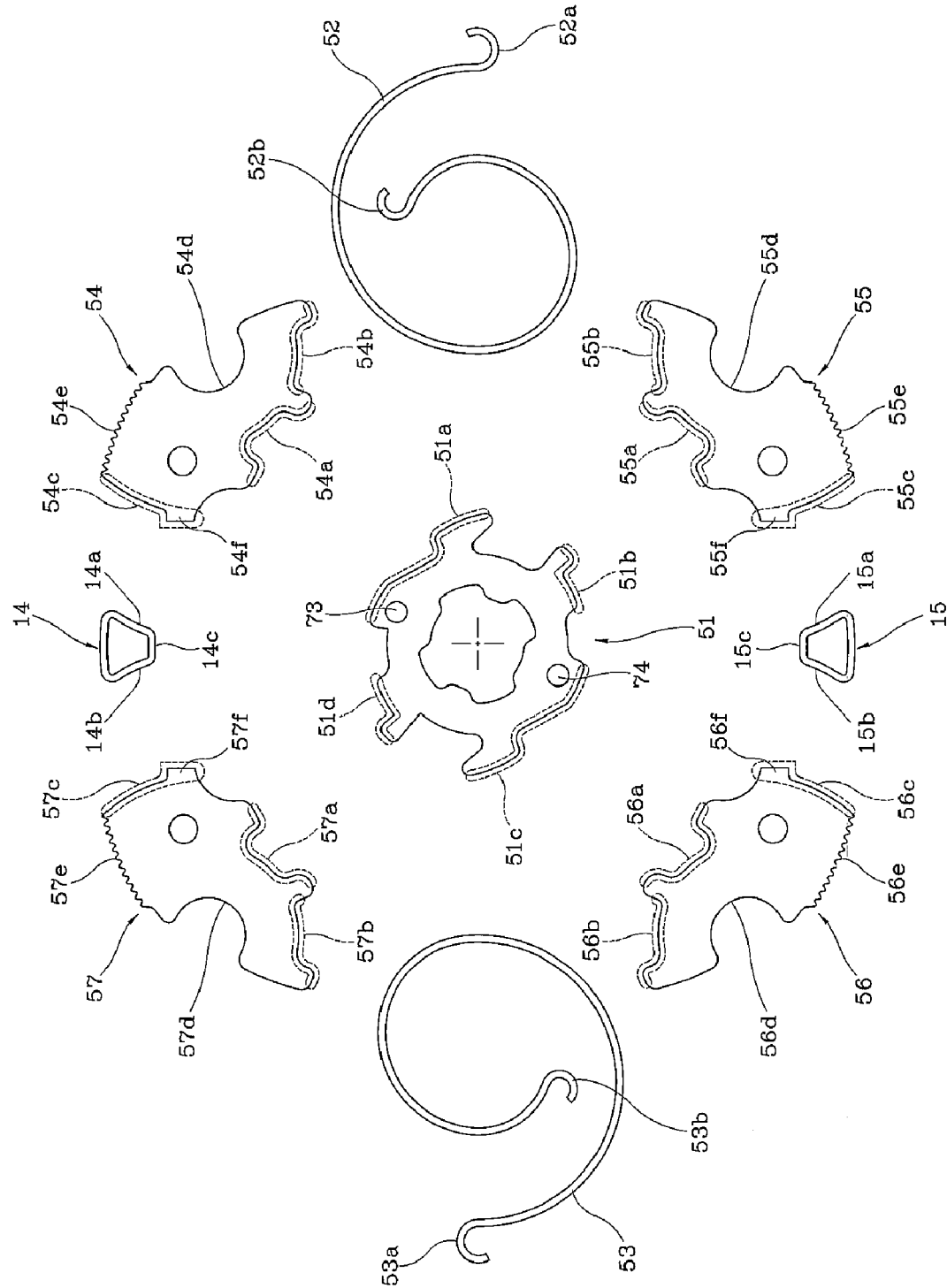
[Fig. 5]

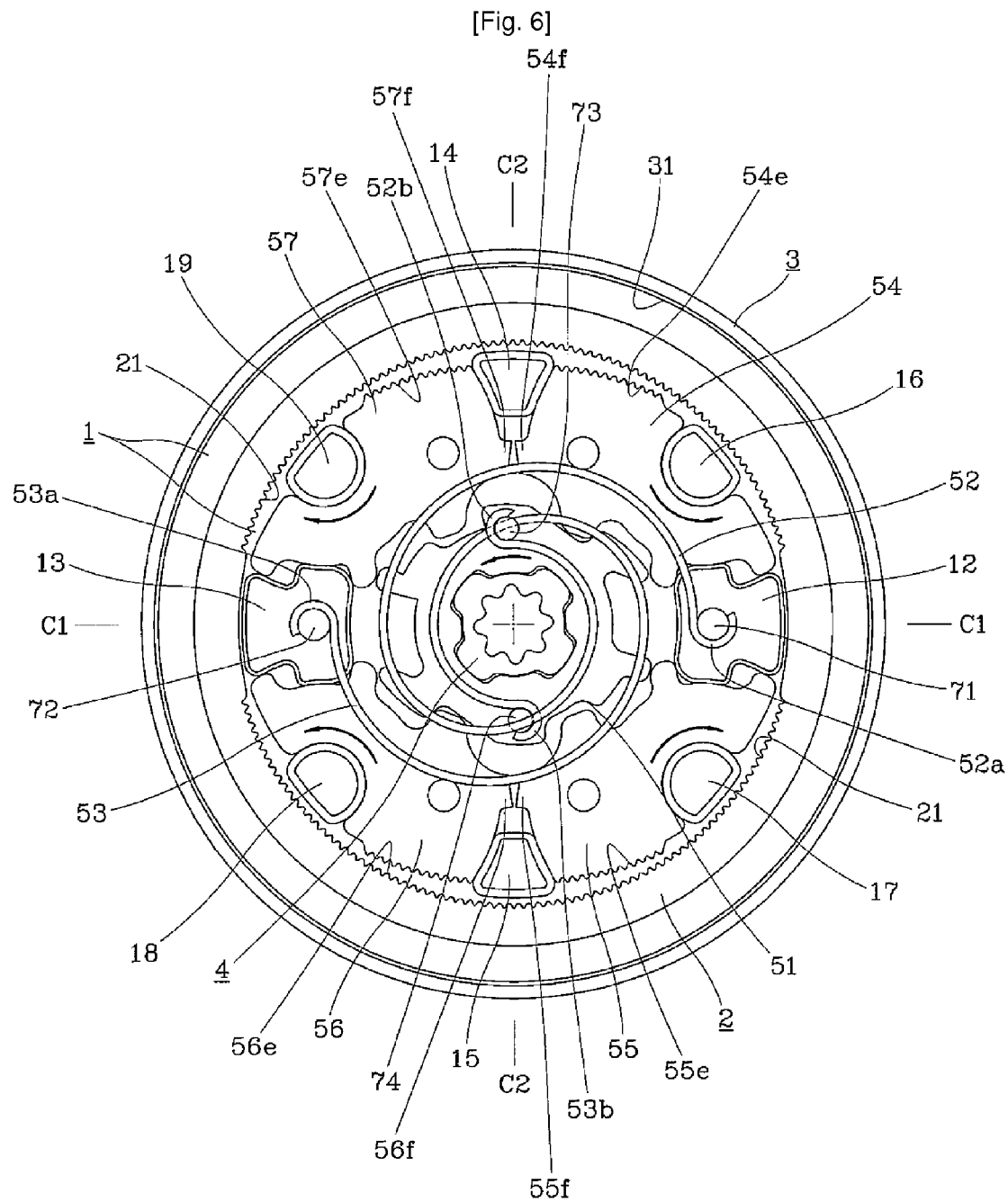
[Fig. 6]

RECLINING DEVICE FOR SEATS IN VEHICLES

TECHNICAL FIELD

The present invention relates to a reclining device for seats in vehicles, particularly a reclining device for seats in vehicles that is provided with improved quality by improving the strength and durability, improves ride comfort for passengers, and prevents operational noise in reclining.

BACKGROUND ART

In general, for enabling passengers to seat in the most comfortable position, seats each include a seat back to support the passenger's back and a seat cushion to support the hip and thighs.

A structure of a seat has a seat cushion frame and a seat back frame. A reclining device that allows a passenger to adjust the angle of the seat back forward/backward to fit his/her body shape is mounted at the joint of the seat cushion frame and the seat back frame.

Two reclining devices, as a pair mounted respectively at the left/right sides of the seat, are mounted as a whole part through spline engagement with both ends of a shaft.

The reclining device is classified into an electric type in which reclining is performed by a shaft rotated by an electric motor and a manual type in which reclining is performed by rotation of a shaft by a passenger operating a lever. Recently, as upscale image of vehicles is emphasized, the trend is to use the electric type.

On the other hand, engagement force of gears between components of the reclining device should be large to increase the overall strength of the reclining device and prevent malfunction. For this reason, the reclining device should have high strength and durability.

Further, when the seat back unnecessarily moves, a passenger feels uncomfortable, which not only deteriorates ride comfort, but makes noise. Therefore, it is required for the reclining device to have a structure that prevents the problems.

DISCLOSURE

Technical Problem

It is an object of the invention to provide a reclining device for seats in vehicles that prevents unnecessary malfunction by improving strength and durability, improves ride comfort, and prevents noise by removing unnecessary movement of a seat back in reclining.

Technical Solution

In order to achieve the above objects, a reclining device of the invention includes: first and second rear guide protrusions formed on a plate holder that each have sides selectively being in surface contact with rear contact areas of first, second, third, and fourth pole gears rotated by a cam lever in reclining, and a front side connecting the sides, facing the cam lever; and gear protrusions formed at the rear contact areas and being in surface contact with the front sides of the first and second rear guide protrusions, when gear teeth of an upper tooth bracket are engaged with gear grooves formed on the first, second, third, and fourth pole gears.

Advantageous Effects

According to a reclining device of the invention, the quality is improved by improving the strength and durability and it is possible to improve ride comfort for drivers and passengers and prevent noise as well in operation of reclining.

DESCRIPTION OF DRAWINGS

FIGS. 1 and 2 are a perspective view and an exploded perspective view, respectively, illustrating connection of a reclining device according to an embodiment of the invention.

FIG. 3 is a front view illustrating an operating part mounted between a plate holder and an upper tooth bracket according to the invention.

FIG. 4 is a front view of FIG. 3 with only first and second cam springs of the operating part are removed.

FIG. 5 is a front view of the operating part that is included in a reclining device according to the invention.

FIG. 6 is a front view illustrating the operation of a reclining device according to the invention.

BEST MODE

The invention is described hereafter in detail with reference to the accompanying drawings.

FIGS. 1 and 2 are a perspective view and an exploded perspective view, respectively, illustrating how a reclining device is connected according to an embodiment of the invention. FIG. 3 is a front view illustrating an operating part mounted between a plate holder and an upper tooth bracket according to the invention. FIG. 4 is a front view of FIG. 3 with only first and second cam springs of the operating part removed. FIG. 5 is a front view of the operating part that is included in a reclining device according to the invention.

A reclining device adjusting the angle forward/backward of a seat back according to the invention, as shown in FIGS. 1 to 5, includes a plate holder 1 fixed to the inside of a seat cushion frame, an upper tooth bracket 2 fixed to the lower end of the seat frame with gear teeth 21 around the inside, a cover bracket 3 receiving the outer circumferences of the plate holder 1 and the upper tooth bracket 2 inside receiving grooves 31 to connect them, a shaft 4 passing through the central holes 11, 23 of the plate holder 1 and the upper tooth bracket 2 and connected with a lever protruding to the side of the seat, and an operating part 5 mounted between the plate holder 1 and the upper tooth bracket 2 and selectively engaging with the teeth 21 of the upper tooth bracket 2 as the shaft 4 rotates.

On the other hand, although not described, the reference numeral 6 denotes a washer into which the end of the shaft 4 is fitted.

A plurality of rotational center protrusions and guide protrusions, which guide the rotational motion of the operating part 5 in rotation of the shaft through the lever, integrally protrude from a side of the plate holder 1 toward the upper tooth bracket 2.

The operating part 5 includes a cam lever 51 that integrally rotates with the shaft 4 through spline engagement in reclining, first and second cam springs 52, 53 of which both ends are fixed to the guide protrusion and the cam lever 51 of the plate holder 1 and apply elastic restoring force to rotation of the cam lever 51, first, second, third, fourth pole gears 54, 55, 56, 57 that are arranged symmetrically up/down and left/right at regular intervals through the guide protrusions and rotational center protrusion in respect to the horizontal center line C1 and the vertical center line C2 of the shaft 4. The first to fourth pole gears 54, 55, 56, 57 are mounted such that two opposite gears across the horizontal center line C1 and the vertical center line C2 rotate in opposite directions, and a part of each pole gear is selectively engaged with the gear teeth 21 of the upper tooth bracket 2.

The guide protrusions formed on the plate holder 1 are composed of first and second front guide protrusions 12, 13 and first and second rear guide protrusions 14, 15. The first and second front guide protrusions 12, 13 are symmetrically arranged up/down and left/right close to the inner circumference of the upper tooth bracket 2 in the horizontal center line C1 of the shaft 4 in respect to the horizontal and vertical center lines C1, C2, and guide the front ends of the first and second pole gears 54, 55 and the third and fourth gears 56, 57 that are rotated as the cam lever 51 is operated. The first and second rear guide protrusions 14, 15 are symmetrically arranged up/down and left/right close to the inner circumference of the upper tooth bracket 2 in the vertical center line C2 of the shaft 4 in respect to the horizontal and vertical center lines C1, C2, and guide the rear ends of the first and second pole gears 54, 55 and the third and fourth pole gears 56, 57 that are rotated as the cam lever 51 is operated.

The first and second rear guide protrusions 14, 15 has both sides 14a, 14b and 15a, 15b that selectively come in surface contact with the rear ends of the first and second pole gears 54, 55 and the third and fourth gears 56, 57, and flat front sides 14c, 15c that face the cam lever 51 and connect the sides 14a, 14b and 15a, 15b, respectively.

The rotational center protrusions formed on the plate holder 1 are composed of first, second, third, and fourth pole gear rotational center protrusions 16, 17, 18, 19 formed between front and rear guide protrusions 12, 13, 14, 15 around the inner circumference of the upper tooth bracket 2 and function as rotational centers for the first, second, third, and fourth pole gears 54, 55, 56, 57 while the cam lever 51 is operated.

Spring protrusions 71, 72, where ends of the first and second cam springs 52, 53 are locked, integrally protrude from a side of the first and second front guide protrusions 12, 13 toward the upper tooth bracket 2, respectively, whereas spring protrusions 73, 74, where the other ends of the first and second cam springs 52, 53 are locked, integrally protrude from a side of the cam lever 51 toward the upper tooth bracket 2.

The first and second cam springs 52, 53 are spiral leaf springs and have hooks 52a, 52b and 53a, 53b, respectively, at both ends to lock to the spring protrusions 71, 72 of the first and second front guide protrusions 12, 13 and the spring protrusions 73, 74 of the cam lever 51.

On the other hand, the cam lever 51 has first, second, third, and fourth pole gear contact areas 51a, 51b, 51c, 51d around the outer circumference that, in reclining, enable the first, second, third, and fourth pole gears 54, 55, 56, 57 to rotate, while being in partial contact with the first, second, third, and fourth pole gears 51, 55, 56, 57.

The first, second, third, and fourth pole gears 54, 55, 56, 57 each have, around the outer circumference, cam lever contact areas 54a, 55a, 56a, 57a that contact with the first, second, third, and fourth pole gears 54, 55, 56, 57, front contact areas 54b, 55b, 56b, 57b that contact with the first and second guide protrusions 12, 13, and rear contact areas 54c, 55c, 56c, 57c that contact with the first and second rear guide protrusions 14, 15 in reclining.

Further, the first, second, third, and fourth pole gears 54, 55, 56, 57 each have, around the outer circumference, protrusion-fitting grooves 54d, 55d, 56d, 57d where the first, second, third, and fourth pole gear rotational center protrusions 16, 17, 18, 19 are fitted and gear grooves 54e, 55e, 56e, 57e that are selectively engaged with the gear teeth 21 of the upper tooth bracket 2.

In detail, the gear grooves 54e, 55e, 56e, 57e are each positioned on the outer circumferences between the rear contact areas 54c, 55c, 56c, 57c and the protrusion-fitting grooves 54d, 55d, 56d, 57d of the first, second, third, and fourth pole gears 54, 55, 56, 57.

Gear protrusions 54f, 55f, 56f, 57f are formed at the rear contact areas 54c, 55c, 56c, 57c, respectively, which are supported by the first, second, third, and fourth pole gears 54, 55, 56, 57, in surface contact with the front sides 14c, 15c of the first and second rear guide protrusions 14, 15, while the gear teeth 21 of the upper tooth bracket 2 are engaged with the gear grooves 54e, 55e, 56e, 57e of the first, second, third, and fourth pole gears 54, 55, 56, 57.

Specifically, the gear protrusions 54f, 57f, of which each upper side is in surface contact with a portion of the front side 14c of the first rear guide protrusion 14, are formed at the rear contact areas 54c, 57c of the first and fourth pole gears 54, 57, respectively. Further, the gear protrusions 55f, 56f, of which each upper side is in surface contact with a portion of the front side 15c of the second rear guide protrusion 15, are formed at the rear contact areas 55c, 56c of the second and third pole gears 55, 56.

The operation of the reclining device according to the invention is described hereafter in detail with reference to FIGS. 3 to 6.

In the initial state, the gear grooves 54e, 55e, 56e, 57e of the first, second, third, and fourth pole gears 54, 55, 56, 57 are in contact with (engaged with) the teeth 21 of the upper tooth bracket 2, so that the seat back is in lock, not rotating about the shaft 4.

With the seat back locked, the gear protrusions 54f, 55f, 56f, 57f formed at the rear contact areas 54c, 55c, 56c, 57c of the first, second, third, and fourth pole gears 54, 55, 56, 57 are in surface contact with the front sides 14c, 15c of the first and second rear guide protrusions 14, 15, respectively.

In this state, as the shaft 4 is rotated by the lever to adjust the angle forward/backward of the seat back, the cam lever 51 rotates in the direction of an arrow and the first, second, third, and fourth pole gear contact areas 51a, 51b, 51c, 51d of the cam lever 51 make contact with the cam lever contact areas 54a, 55a, 56a, 57a of the first, second, third, and fourth pole gears 54, 55, 56, 57.

As a result, the first pole gear 54 is rotated counterclockwise by the first pole gear rotational center protrusion 16 as indicated by an arrow, the second pole gear 55 is rotated clockwise by the second pole gear rotational center protrusion 17 as indicated by an arrow, the third pole gear 56 is rotated counterclockwise by the third pole gear rotational center protrusion 18 as indicated by an arrow, and the fourth pole gear 57 is rotated clockwise by the fourth pole gear rotational center protrusion 19 as indicated by an arrow.

Accordingly, the gear grooves 54e, 55e, 56e, 57e of the first, second, third, and fourth pole gears 54, 55, 56, 57 are released from the contact (engagement) with the gear teeth 21 of the upper tooth bracket 2, so that the seat back becomes operable to recline about the shaft 4.

When the lever is released after the seat back is adjusted to a desired angle, the first and second cam springs 52, 53 that have been wound and compressed by the cam lever 51 re-rotate the cam lever 51, which has been rotated, to the initial position, expanding (restoring) to the initial state.

Accordingly, the first, second, third, and fourth pole gears 54, 55, 56, 57 following operation of the cam lever 51 contact again with (are engaged with) the gear teeth 21 of the upper tooth bracket 2 through the gear grooves 54e, 55e, 56e, 57e, so that the seat back maintains the position at the adjusted angle.

According to the reclining device of the invention operating as described above, since external force applied to the seat back is supported at four portions of the first, second, third, and fourth pole gears 54, 55, 56, 57, it is possible to improve the overall strength and durability.

The reclining device that is improved in strength and durability is operable to prevent reclining due to external force applied to the seat back by itself as long as the lever is not actuated.

Further, according to the reclining device of the invention, the various protrusions 12 to 19 formed on the plate holder 1 and the operating part 5 are symmetrically up/down and left/right in respect to the horizontal center line C1 and the vertical center line C2 of the shaft 4, it may be used for the driver's seat as well as for the passenger's seat. Therefore, it is possible to reduce manufacturing cost.

Further, when the reclining device of the invention is in lock by engagement of the gear grooves 54e, 55e, 56e, 57e of the first, second, third, and fourth pole gears 54, 55, 56, 57 with the gear teeth 21 of the upper tooth bracket 2, the gear protrusions 54f, 55f, 56f, 57f of the first, second, third, and fourth pole gears 54, 55, 56, 57 are in surface contact with the front sides 14c, 15c of the first and second rear guide protrusions 14, 15, and maintain the surface contact even though external load is applied (load due to a collision and a rear-end collision). It is possible to improve the engagement force of the first, second, third, and fourth pole gears 54, 55, 56, 57 with the upper tooth bracket 2 by increasing the supporting force of the first, second, third, and fourth pole gears 54, 55, 56, 57.

Further, since the load transmitted to the first, second, third, and fourth pole gears 54, 55, 56, 57 is sufficiently distributed to the first and second rear guide protrusions 14, 15 through the gear protrusions 54f, 55f, 56f, 57f, it is possible to improve the overall strength and durability.

Further, gaps between the first, second, third, and fourth pole gear rotational center protrusions 16, 17, 18, 19 and the protrusion-fitting grooves 54d, 55d, 56d, 57d are removed as much as possible during the clockwise and counterclockwise rotation of the first, second, third, and fourth pole gears 54, 55, 56, 57 by reclining, which not only more contributes to improve ride comfort for passengers, but prevents operational noise.

The invention claimed is:

1. A reclining device for vehicle seats, comprising:
    a tooth bracket having gear teeth;
    first second, third and fourth rotatable pole gears, each of said pole gears having a respective gear protrusion formed at a rear contact area and respective gear grooves which are selectively engageable, upon rotation of the pole gear, with the gear teeth of said tooth bracket;
    a plate holder having first and second rear guide protrusions, said first rear guide protrusion having two side surfaces respectively in surface contact with rear contact areas of said first and fourth pole gears, said second rear guide protrusion having two side surfaces respectively in surface contact with rear contact areas of said second and third pole gears, said first and second rear guide protrusions each having a respective front side surface interconnecting the two side surfaces;
    a cam lever for rotating said first, second, third and fourth pole gears such that the gear grooves of said first, second, third and fourth pole gears move into or out of engagement with the gear teeth of said tooth bracket, said front sides of said first and second rear guide protrusions facing said cam lever,
    wherein the gear protrusions of said first and fourth pole gears are in surface contact with the front side of said first rear guide protrusion and the gear protrusion of said second and third pole gears are in surface contact with the front side of said second rear guide protrusion when the gear grooves of said first, second, third and fourth pole gears are engaged with the gear teeth of said tooth bracket.

2. The reclining device according to claim 1, further comprising a shaft for rotating said cam lever wherein the front sides of the first and second rear guide protrusions are parallel with a horizontal center line of said shaft.

3. The reclining device according to claim 1, wherein upper sides of the gear protrusions formed at the rear contact areas of the first and fourth pole gears are in surface contact with a half of the front side of the first rear guide protrusion, respectively, and
    upper sides of the gear protrusions formed at the rear contact areas of the second and third pole gears are in surface contact with a half of the front side of the second rear guide protrusion, respectively.

* * * * *